Sept. 13, 1960 E. A. AVAKIAN ET AL 2,952,080

CRYPTIC GRID SCRAMBLING AND UNSCRAMBLING METHOD AND APPARATUS

Filed Sept. 12, 1957 4 Sheets-Sheet 1

INVENTORS
E. A. AVAKIAN
J. J. MALIN
W. P. HOEFLINGER

BY [signature]
ATTORNEY

INVENTORS
E. A. AVAKIAN
J. J. MALIN
W. P. HOEFLINGER
BY
[signature]
ATTORNEY

INVENTORS
E. A. AVAKIAN
J. J. MALIN
W. P. HOEFLINGER
BY
V. F. Presson
ATTORNEY

INVENTORS
E. A. AVAKIAN
J. J. MALIN
W. P. HOEFLINGER
BY
R. F. Presson
ATTORNEY

United States Patent Office 2,952,080
Patented Sept. 13, 1960

2,952,080

CRYPTIC GRID SCRAMBLING AND UNSCRAMBLING METHOD AND APPARATUS

Emik A. Avakian, Tuckahoe, N.Y., Joseph J. Malin, Rowayton, Conn., and William P. Hoeflinger, South Salem, N.Y., assignors to The Teleregister Corporation, Stamford, Conn., a corporation of Delaware Filed Sept. 12, 1957, Ser. No. 683,593

12 Claims. (Cl. 35—2)

This invention relates primarily to cryptic grid scrambling and unscrambling methods and apparatus, and more particularly to a novel method and apparatus for scrambling, disguising, concealing, and/or encoding various types of recordable information, and the unscrambling, revelation or decoding thereof.

An object of the present invention is to provide an arrangement for scrambling, encoding, or otherwise concealing recorded or recordable information or matter to prevent copying and/or fraudulent or unauthorized use of the concealed matter while at the same time enabling the concealed matter to be quickly and easily revealed by authorized persons.

A description of an example of the manner in which the present invention may be employed will serve to illustrate and define various features, principles, objects, and advantages thereof, and it is to be understood that the invention is not by any means limited to the described embodiment and the principles but may be employed in many other ways and for many other purposes.

Many of the larger banks have a number of branches in the same and other cities as well as unit locations within a single office, and it is often very difficult and time consuming, if at all possible, for a customer usually doing business at one of the locations of the bank to make account transactions, such as withdrawals, at another location on the presentation of his pass book, or to cash checks, since his signature card is usually kept only at the location where he normally does business. To avoid this difficulty it has been proposed that the customer's signature be placed in his pass book so that the bank teller could verify the customer's signature or endorsement on such as a withdrawal slip or check with that in the book when the customer makes account transactions, and the customer could thereby conduct transactions at any and all locations of the bank without each area being required to keep a set of the usual signature cards. The above arrangement has a number of disadvantages, and one of the most serious objections thereto is the fact that in the event the pass book is lost or stolen someone other than the owner could rather easily trace, forge, copy or otherwise reproduce the owner's signature contained in the book on a withdrawal slip and thus make one or more unauthorized transactions to the owner's account at one or more of the bank's locations before the bank could be informed of the loss of the pass book and take the necessary precautionary measures.

The present invention is directed to a system and apparatus whereby all the above enumerated and other advantages of having a customer's signature in a pass book are retained and all the disadvantages are eliminated. This is accomplished in acordance with the teachings of the present invention in such a manner that the customer's signature is so encoded, disguised, scrambled or otherwise concealed in an owner's pass book as to render the same for all practical purposes unrecognizable or undecipherable to anyone having possession of the book while at the same time permitting authorized persons such as the bank teller to very easily and quickly unscramble the signature in the book for comparison with the signature or endorsement on a withdrawal slip or check of the person presenting the book and slip or check to the teller for an account transaction.

In accordance with the above a further more specific object of the invention is to provide a system and apparatus for scrambling recorded material, such as a signature for insertion in a bank pass book, to prevent copying thereof by others and to provide means for readily and quickly unscrambling the signature by authorized persons. In the above and in the following, the term "signature" is employed to indicate the recorded or recordable matter to be scrambled and unscrambled, and it is to be understood the term "signature" is used only for illustrative purposes and the invention can just as readily be used to scramble and unscramble other recorded or recordable matter whether printed, typed, pictorial, etc.

In practicing the invention in the above set forth circumstance or environment where a signature is scrambled for placing in a bank pass book, certain "bits" or "samples" of the signature herein referred to as informational bits are taken and combined, scrambled, intermixed or encoded with other non-informational bits from a so-called dummy and the result placed in the pass book. The intermixed result is such that intelligence is not apparent therefrom. At the bank the teller has equipment for effectively removing or blanking out the intermixed bits of the dummy to reveal the informational bits of the signature, and to the eye these informational bits appear to form a continuous image which can be readily compared with that of the person presenting the pass book. To take the desired informational bits from the signature a grid or sectionalizing screen is placed over the signature and the signature photographed through the screen. With the same sectionalizing screen the non-informational scrambling bits are similarly taken from a dummy or reproduction of a number of different samples of other handwritings and then intermixed with the signature bits to form the final cryptographic display which is placed in the pass book. At the bank the teller by use of a viewing screen effectively removes or blanks out the bits of intermixed non-informational bits derived from the dummy to reveal the signature bits which to the eye appear as a sufficiently complete image to enable comparison thereof with a full signature.

As set forth hereinafter there are a number of controlling factors and conditions which must be considered to produce satisfactory results and these will be apparent as will numerous additional objects, advantages and features of the invention in the following detailed description of the preferred embodiment and application thereof, wherein reference is made to the accompanying drawings forming a part hereof, and in the latter of which:

Figure 1:
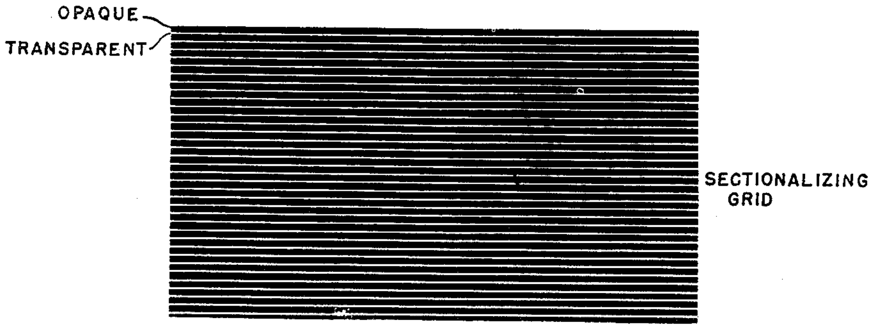
Fig. 1 is a photolithographic reproduction of an enlarged photograph of a section of the sectionalizing or grid screen.

The grid or sectionalizing screen seen in Fig. 1 comprises a screen having a regular pattern of opaque and transparent sections. In the embodiment shown the grid screen consists of a series of equally spaced parallel horizontal opaque and transparent sections. If desired, as will be more apparent hereinafter, other arrangements of grid patterns such as herringbone, regular curves or other geometric configurations could be employed, and the grid screens may be produced by any suitable manner such as by photographic or other means. The actual dimensions of the grid screen employed are such that the screen will adequately cover a normal size signature and, for example, may be four inches long and two inches wide. For reasons hereinafter apparent the ratio of the black or opaque area of such a screen to the transparent area is preferably substantially five to one, and with this ratio the width of the transparent sections or lines is preferably in the neighborhood of five thousandths of an inch and the width of the alternate black or opaque sections is in the neighborhood of twenty-five thousandths of an inch. The above dimensions of the widths of the lines of the grid screen, as hereinafter apparent, give sufficient resolution to the average size signature to enable suitable comparisons with other true or forged signatures, and are merely illustrative and other widths may be employed if desired. However, the five to one ratio of opaque to transparent sections of the grid screen is somewhat critical in the arrangement to be disclosed hereinafter for optimum results but here again other ratios could be employed if another degree of resolution were required. In the case of encoding a signature, if still finer details were desirable than could be obtained with a grid screen of the above dimensions, the signature could be written more than once and the plurality of signatures sectionalized simultaneously as hereinafter pointed out so that whatever detail that might be lost in one signature would probably be apparent in one or more of the others.

The grid screen, Fig. 1, as well as the viewing and other screens may be prepared in any of the well known manners such as by drawing on a larger scale and photographically reducing to the desired size or by machine technique. The signature to be encoded or cryptographically masked is preferably written with a ball-point pen with black or dark ink on a white background, and is termed the "raw" signature.

Figure 6:
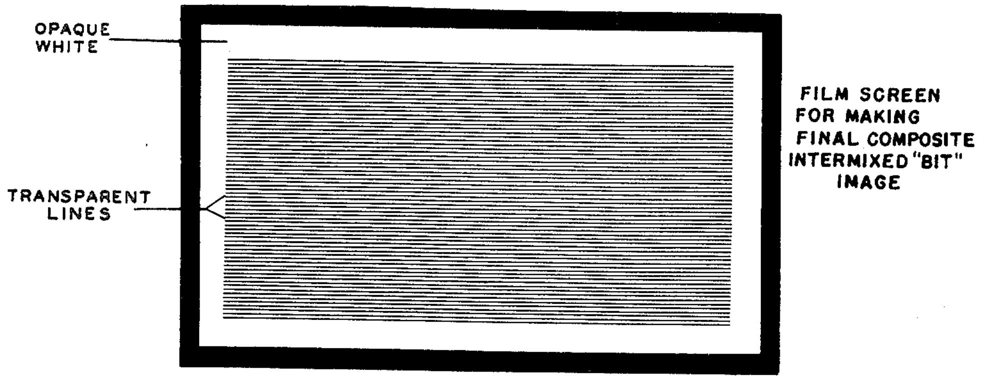
Fig. 6 is a photolithographic reproduction of a photograph of an opaque white screen on a black background employed in the invention.

Over such a signature is placed the opaque white grid screen of Fig. 6 having a five to one ratio of opaque white sections to transparent parallel sections. This step is hereinafter referred to as step 1. Thus the only portions of the signature that would be photographed or reproduced would be the parts or bits thereof not covered by the white or opaque horizontal sections of said grid screen, or the bits of the signature showing through the transparent sections of said grid screen, the making of which is explained below:

The opaque white screen such as Fig. 6, which is shown on a black background, is made from the grid screen of Fig. 1. The opaque white screen is made so that the screen consists of white opaque horizontal sections five units wide separated by transparent sections one unit wide. The screen of Fig. 6 can be made in a number of different ways and one way is to spray a transparent film with an opaque light sensitive emulsion, lay thereover the reverse of the grid screen, i.e., five units wide transparent to one unit wide of opaque black, expose to light, and then wash away the unexposed emulsion under the black lines of the said reverse of the grid screen.

Figure 3:
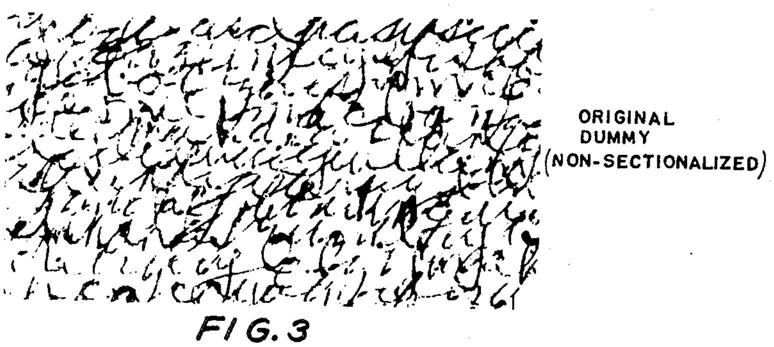
Fig. 3 is a photolithographic reproduction of an enlarged photograph of a section of the various samples of various hand-writings constituting the so-called original dummy.

The next step, or step 2, is the preparation of so-called encoding dummy or bits for mixing with or establishing extraneous background for the signature bits so that when so encoded or mixed the signature bits will not be recognizable as such, and it will not be possible or apparent how some or all of the signature bits should or could be connected together to form or reproduce the original signature. For this purpose an original dummy is prepared which in the described case of scrambling a signature consists of a number of closely spaced horizontal lines of a large number of different styles of handwritings, preferably in lower case, on a white background such as that of Fig. 3. The original dummy is substantially equal in size to the grid screen, Fig. 1, say four by two inches, and preferably is prepared by using a ball-point pen to give uniform width of line. Obviously, if typed or printed matter is to be encoded, the original dummy would be made of the same type of material that is to be encoded.

Figure 4:
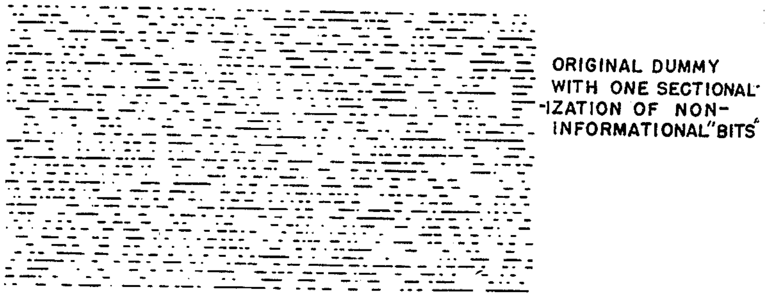
Fig. 4 is a photolithographic reproduction of an enlarged photograph of a part of the sectionalized dummy after one sectionalization and showing one group of the non-informational encoding bits thereof.

The full complement of the encoding dummy bits are made up of two groups of bits, group A and group B. Group A is made by laying the grid screen, Fig. 1, over a negative of the original dummy, Fig. 3, and photographically printing through both of said negatives. The result is a positive film of horizontal sections or bits, group A, of the original dummy with the width of the sections of the reproduced bits being one-fifth the width of the clear horizontal sections similar to that of Fig. 4, In effect a selected one-sixth of the original dummy has been reproduced and with the grid screen of Fig. 1 the width of the reproduced sections is approximately five thousandths of an inch.

Figure 5:
Fig. 5 is a photolithographic reproduction of an enlarged photograph of a section of the first group of encoding bits from the original dummy combined with a second group of encoding bits from the original dummy to form the intermixed encoding dummy.

Group B of the dummy bits can be made in the same manner from the same original dummy (Fig. 3), and the two groups combined to form an encoding dummy such as Fig. 5. The combining of group A and B bits is effected by placing the two positives on films one over the other, one right side up and the other in reverse or rotated 180° with the reproduced bits of the two groups slightly offset or out of registration and then making a negative therefrom. The result is a positive on transparent film of the encoding dummy having an appearance such as Fig. 5. The spacing between the horizontal bit sections of groups A and B, however, are not uniform but rather, as reproduced in Fig. 5, with alternate one and three unit spacings between consecutive pairs of group bits. In other words, beginning with a group A bit section of one unit vertical width, a group B bit section of similar width is spaced one unit of width therebelow, and the next group A bit is three unit widths below it.

The purpose of employing two groups of dummy bits, A and B, which have no connective relationship to each other, is to effect complete encoding or cryptographic masking. If but one group of dummy bits were used, this group would immediately have bits which would have connective relationships between its own adjoining bits and thus if a group of signature bits were introduced in between only one group of dummy bits the eye would immediately discover where the connective relationship of the bits of the single dummy group was interrupted and the signature would immediately stand out. With two groups of dummy bits the connective relationship of any given group is not apparent and the two groups with the interjection of the signature bits form a truly scrambled image.

Figure 7:
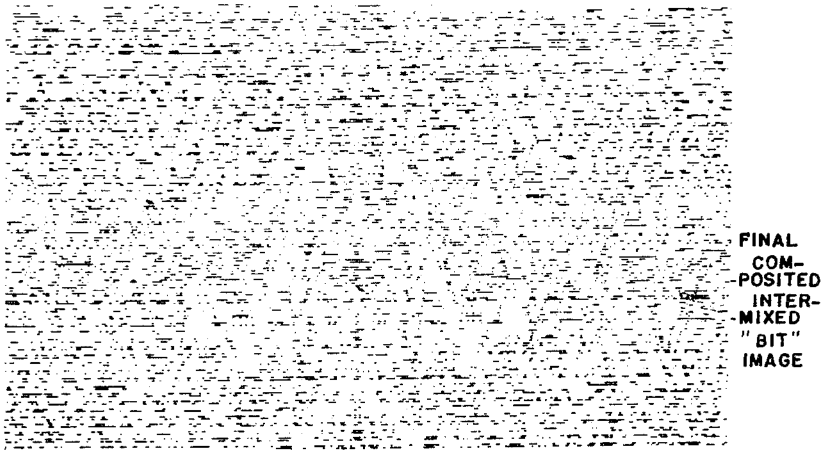
Fig. 7 is a photolithographic reproduction of an enlarged photograph of the major part of a scrambled image containing the informational signature bits intermixed with the non-informational dummy bits.

The next step, or step 3, is the mixing or combining of the non-informational bits of the encoding dummy, Fig. 5, with the signature bits showing through the transparent section of the white opaque grid screen, as explained in step 1, to produce the final scrambled or encoded image as shown in Fig. 7.

The opaque white screen, Fig. 6, is now placed under the doubly sectionalized encoding dummy, Fig. 5, with the transparent sections of the white screen directly under and parallel with the center of the three-unit wide clear sections of the encoding dummy of Fig. 5, and in this position group A bits and group B bits will be directly over the opaque white portions of the screen. These two pieces of film are then placed over the signature, and a print such as a contact print made of the combined pile. Instead of this combined pile of two pieces of film, one the encoding dummy and the other the opaque white screen laid in exact registration relative to each other as mentioned above, the opaque white screen may be printed on the back of the same transparent film on which the encoding dummy appears. Thus there will never be a problem of having the two physically separate pieces go out of alignment with respect to each other, or become separated. This one piece may be termed the master encoder. The master encoder will then be laid over the "raw" signature and there is no registration or positioning problem in laying the master encoder over the "raw" signature. It is sufficient to have the signature lie anywhere under this master encoder to have a print of the resulting scrambled image. This print is a combination of a series of evenly spaced equal width horizontal sections of two encoding bit sections separated by a signature bit section, such as shown in Fig. 7. This print or a copy thereof would then be placed in the bank customer's pass book.

Thus the three described steps consist chiefly of (1) obliterating certain sections of the signature and leaving exposed samples or parts of the signature, (2) taking or removing and reproducing samples or bits (in two groups) of a dummy, and (3) combining the bits obtained in steps (1) and (2) to produce a combined unintelligible scramble of the various bits to form the so-called scrambled image.

Figure 2:
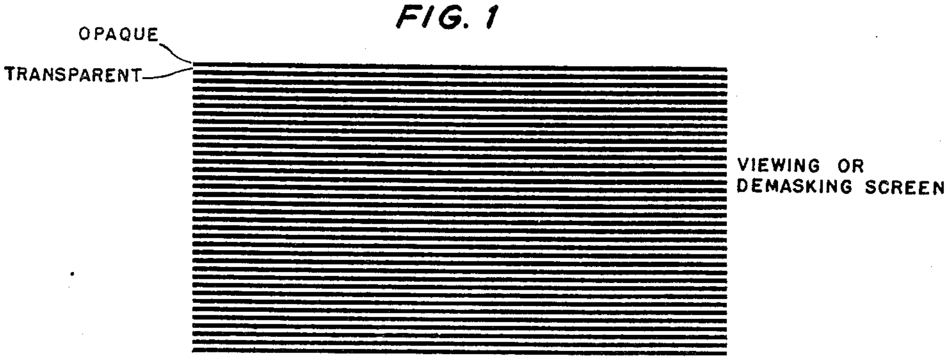
Fig. 2 is a photolithographic reproduction of an enlarged photograph of a section of the viewing or reading screen.

To unscramble, reveal or remove the encoded non-informational dummy bits from the unintelligible scramble such as that of Fig. 7, a reading screen, Fig. 2, is employed. The reading screen consists of a series of alternate opaque and transparent horizontal sections or lines, and may be produced in a manner similar to that used to produce the grid screen, Fig. 1. However, the width of the opaque and transparent sections of the reading screen, while bearing a definite relation to the width of the grid screen, is different therefrom. With a five to one ratio grid screen, Fig. 1, having transparent and opaque sections or lines five and twenty-five thousandths of an inch wide respectively, the opaque lines or sections of the viewing screen, Fig. 2, are preferably four times the width of those on the grid screen or twenty thousandths of an inch wide. The transparent sections of the viewing screen are equal in width to one-half the opaque sections thereof or ten thousandths of an inch.

Figure 8:
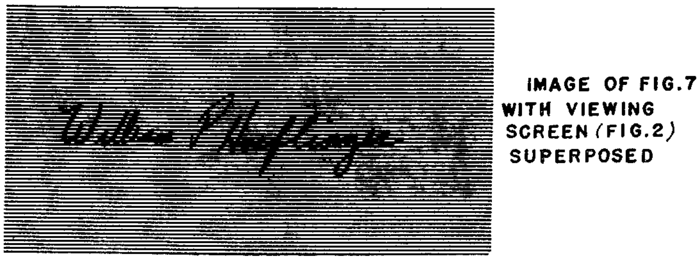
Fig. 8 is a photolithographic reproduction of a scrambled image as in Fig. 7, containing a signature over which has been positioned in proper alignment a viewing screen (Fig. 2) so that the signature is decoded and becomes clearly apparent.
Figure 9:
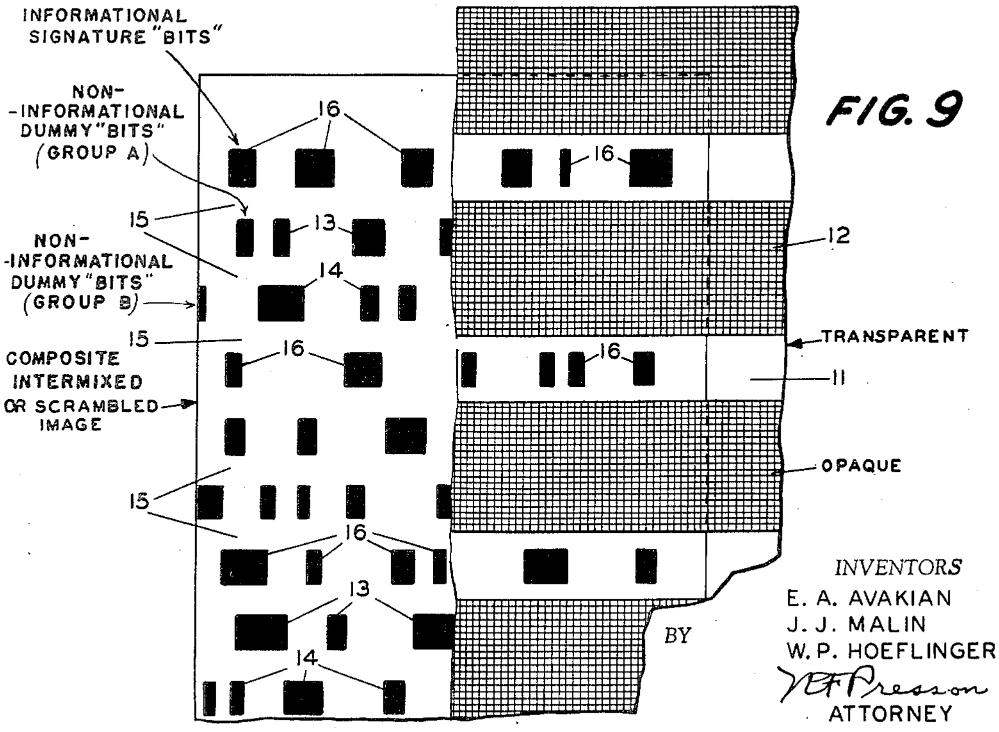
Fig. 9 is an enlarged diagrammatic view of a section of the scrambled image with the viewing screen thereover.

By placing the viewing screen, Fig. 2, over the composite intermixed image of Fig. 7, as indicated in Fig. 9, the non-informational bits of the encoding dummy, Fig. 5, will be effectively dropped, blanked or cancelled out by the opaque sections of the viewing screen while the signature bits are observable through the transparent sections of the viewing screen as shown in Fig. 8. Referring to Fig. 9 showing a greatly enlarged section of the viewing screen over a part of a similarly enlarged section of the scrambled image, reference numeral 11 indicates the horizontal transparent sections or lines of the viewing screen and 12 the opaque sections thereof. As noted, the width of these sections is at a one to two ratio. In the scrambled image, 13 represents horizontal lines of group A or B encoding bits and 14 represents lines of the other group. As can be seen in Fig. 9, the lines of a pair of adjacent encoding bits are separated by a clear horizontal section 15 equal in width to that of either one of the dummy lines 13 or 14, and also each pair of encoding bit lines is separated by a distance equal to three times the width of one of said encoding bit lines, and in the center thereof are signature bit lines 16 equal in width to that of the encoding bit lines. Accordingly, the sequence of lines in the scrambled image is (1) a signature bit line 16, (2) a clear section 15, (3) an encoding bit line 13, (4) another clear section 15, (5) the other encoding bit line 14, and (6) another clear section 15, after which the sequence is repeated. Theoretically all these lines and sections are of equal width and actually some may have gained or lost a little width at the expense of an adjacent line or section during the various reproduction steps. However, within limits some such gain or loss does not adversely offset the final result and a gain or loss in one step of producing the scrambled image, Fig. 7, may cancel or mitigate the loss or gain in another.

It will be understood that in placing the viewing or demasking screen over the final composite intermixed image the horizontal lines of the two must be substantially parallel. In the case of a bank teller wishing to unscramble a signature from a pass book, the book could easily be slid under a permanently fixed viewing screen. If the lines of the scrambled image and the viewing screen were not parallel, diffraction patterns would be observable which would become wider or narrower as the pass book is rotated in one direction or the other. The direction of rotation of the book should be such as to increase the width of the diffraction patterns so that one large dark area is formed over the entire area of the viewing screen. Then while keeping the rotation angle of the book constant, it should be moved slowly and slightly up and/or down so that a pair of lines of scrambled bits of the dummy are covered by the opaque lines of the viewing screen. In this position the signature bits and sufficient detail thereof are revealed to enable the comparison thereof with another signature.

Figure 10:
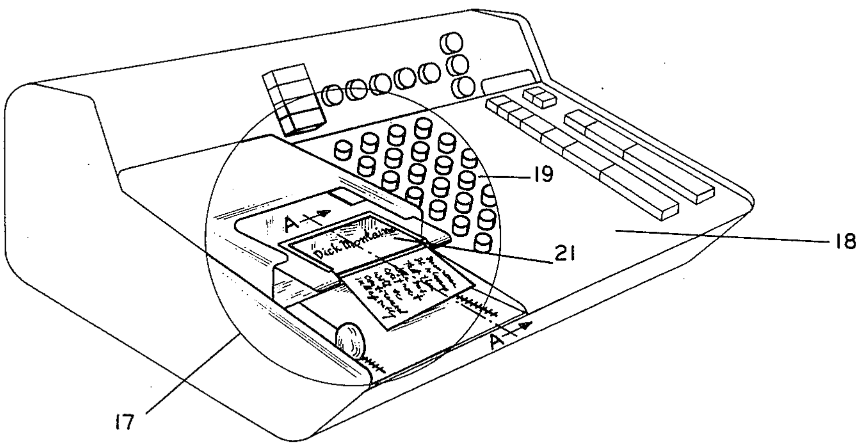
Fig. 10 is a perspective view of a teller's machine showing how the invention may be incorporated therein, and showing a typical open pass book positioned in the machine.
Figure 11:
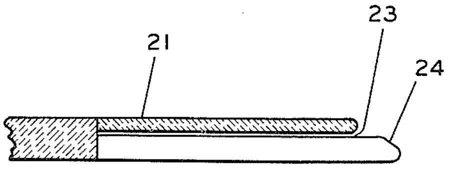
Fig. 11 is an enlarged sectional view taken substantially on line A—A of Fig. 10, but with the pass book omitted.

In Fig. 10 a teller machine 18 is shown and indicates how a signature viewing station 17 may conveniently be incorporated therein to the left of the keys 19 thereof. This preferably consists, as best shown in the enlarged sectional view Fig. 11, of a transparent window 21 with the viewing screen formed in or on the lower surface thereof. One of the covers of the pass book, such as the front, with the scrambled image on the inside face thereof is slid face up under the window in the space 23 and manipulated in the manner set forth to bring out the signature bits. Below the space 23 is a pressure plate 24 for holding the scrambled image firmly against the underside of the window 21. The teller machine 18 could be so located, such as wholly or partly under the counter, as to be out of the customer's sight and the signature comparison could be quickly and conveniently performed by the teller in conjunction with the usual posting operations without the customer knowing of the comparison.

From the above description detailing one method of performing and one application of the principles of the invention, it will be apparent that numerous modifications in and to the method of performing the invention may be made, as well as being employed in many other applications, for example, for use with credit or charge-account cards for stores, clubs, automobile service stations, and the like, as well as projection or transparency viewing systems. Also, the invention is applicable for use with identification cards where vertification of the identity of a person is of great importance. Here the picture of the person could be placed in the identification card and scrambled. Unauthorized persons as well as the person to whom it was issued may not be aware of the picture being in the identification card. It is desired, therefore, that only such limitations be placed thereon as are set forth in the appended claims.

What is claimed is:

1. The method of incorporating an intelligible display, such for example as a signature, in a composited scrambled image wherein the display is not directly visible, which comprises making a first image of the display with certain sections deleted in regularly spaced intervals to provide a multiplicity of discrete non-contiguous informational bits of said image but which by themselves are sufficient to delineate the said display, making a second image derived from subject matter different from the first image and also having certain sections deleted in regularly spaced intervals to provide a multiplicity of discrete non-contiguous non-informational bits which provide no intelligible information as to said display and which are incapable of supplementing the first mentioned bits to build up a recognizable image of said display, and superposing said images so that substantially all the second mentioned bits are located in a predetermined intermixed relation between the first mentioned bits to form a unitary composited intermixed image wherein the said display is not visually apparent until exposed through a de-masking viewing screen having alternate visual obscuring and non-obscuring sections correlated respectively with the location of the second and first mentioned bits and without changing the spatial relation of the intermixed informational and non-informational bits.

2. The method according to claim 1 in which a third image is made and derived from said different subject-matter to provide another multiplicity of discrete non-contiguous non-informational bits which are also incapable of supplementing any of the first mentioned bits to build up a recognizable image of said display and which are spaced and distributed in a different relation with respect to the spacing and distribution of the non-informational bits of the said second image, and superposing the three images so that substantially all the bits of the second and third images are located in a predetermined intermixed relation between the first mentioned bits to form said unitary composited single image.

3. The method according to claim 2 in which the three images are superposed and are photographically recorded to produce a unitary composited record wherein the said symbol is not discernible until viewed through a de-masking screen.

4. The method according to claim 1 in which the symbol is in the form of a signature or the like to be identified, and wherein the said different subject-matter is constituted of a series of other and different signatures which are located in random fashion with relation to the signature to be identified.

5. Apparatus for making a cryptographic recording of an intelligence display, such as for example a personal signature, which recording is in the form of a composited image wherein the display is not directly discernible, comprising means including a sectionalizing screen having alternate obscuring and non-obscuring sections to sectionalize the display into spaced discrete and non-contiguous informational bits but which by themselves are sufficient to delineate said display, means including a record of other subject matter different from said display said record also constituted of discrete non-contiguous but non-informational bits which provide no intelligible information as to said display and which are incapable of supplementing the first mentioned bits when superposed on the first mentioned bits to build up a recognizable image of said display, said record when superposed on the said sectionalized display producing a unitary composited image of said informational bits and said non-informational bits wherein the said non-informational bits are located in predetermined intermixed relation between the informational bits whereby the said display is not visually discernible until the superposed sectionalized display and said record are viewed through a sectionalized de-masking screen and without changing the spacial relation of the intermixed informational and non-informational bits.

6. Apparatus according to claim 5 in which the obscuring sections of the first mentioned sectionalizing screen have at least twice the area of the non-obscuring sections and said record of said different subject-matter is constituted of two distinct sets of non-informational bits each set being derived from a plurality of sectionalizations of the said different subject-matter one sectionalization extending along one dimension of said different subject-matter and the other sectionalization extending along a different dimension of said different subject-matter.

7. Cryptographic apparatus, comprising a member carrying a multiplicity of discrete non-contiguous informational bits derived from a series of spaced sectionalizations of a display which bits by themselves are sufficient to render the display visually identifiable without spacial change in the positions of said bits with relation to one another, another multiplicity of non-informational bits of a subject-matter different from said display which non-informational bits are incapable of supplementing said informational bits to build up an identifiable image of said display, said non-informational bits being respective sectionalized samples of said different subject-matter and being interspersed between said informational bits to break up the visual continuity of said informational bits and thereby to render said display non-identifiable until said non-informational bits are visually obscured and without changing the spacial relation of any of said bits with relation to one another.

8. Cryptographic apparatus comprising a member carrying a multiplicity of discrete non-contiguous informational bits derived from a series of sectionalizations of a display but sufficient by themselves to render the display visually identifiable without spacial displacement of the bits with relation to one another, as well as a plurality of sets of non-informational bits of a subject-matter different from said display which non-informational bits are incapable of supplementing said informational bits to build up an identifiable image of said display, each of said sets of non-informational bits being respective sectionalized samples of said subject-matter with the sectionalizations of one set selected extending along one dimension of said subject-matter at an angle to the direction of sectionalization of the other of said sets of non-informational bits, said non-informational bits being interspersed with respect to the informational bits whereby no regular pattern identifying said display is directly visually discernible from the record.

9. A master encoding device for cryptographically recording a display to be identified, for example a signature or the like, comprising a transparency having a series of spaced light obscuring strips separated by corresponding intervening non-obscuring strips and in registry with each of said obscuring strips an array of non-informational opaque markings consisting of discrete non-contiguous printed elements which bear no intelligible relation to the display and which are incapable of supplementing parts of the display to build up an identifiable image thereof, said device being arranged for superposition over the display to expose the display through the non-obscuring strips thereby to form a composite intermixed image wherein the display is not visually identifiable, which intermixed image contains images of sectionalized elements of the display as exposed through said non-obscuring strips as well as images of said printed elements which latter elements are randomly oriented with respect to said sectionalized elements of the display.

10. Apparatus for cryptographically recording a display to be identified, such for example as a signature and the like, comprising a first transparency having a multiplicity of non-contiguous non-informational bit markings arranged in successive spaced rows with the spacing between adjacent bits and their orientation having no informational relation to the display, a second transparency having an opaque white surface which is sub-divided by a series of transparent lines, said second transparency arranged to be superposed over the first transparency with the transparent lines of both transparencies in registry to form a composite screen for exposing the display therethrough to produce a final composite intermixed image comprised of informational bits of the display interspersed in random fashion with said non-informational bits, said final image including said display in non-identifiable form until exposed through a correlated de-masking screen.

11. Apparatus according to claim 10 in which each of said transparencies is a photographic film, the first film being integrally attached on one of its faces to the other film to form a unitary cryptographic master screen.

12. A master encoding screen for cryptographic recording of a display, such as a signature and the like, comprising a member having a white opaque surface which is sub-divided into a series of spaced transparent lines, the opaque white portions of said member having printed thereon a multiplicity of non-informational bit markings arranged in spaced rows with the interrow spacing in registry with said transparent lines, said bit markings being derived from linear sectionalizations of a subject-matter which is different from that of the display.

References Cited in the file of this patent

UNITED STATES PATENTS

| | | |
|---|---|---|
| 845,798 | Lehr | Mar. 5, 1907 |
| 2,171,533 | Barbelle | Sept. 5, 1939 |
| 2,417,163 | Horst | Mar. 11, 1947 |